United States Patent
Wang et al.

(10) Patent No.: US 9,648,677 B2
(45) Date of Patent: *May 9, 2017

(54) LED DRIVING CIRCUIT AND METHOD USING SINGLE INDUCTOR

(71) Applicant: Silergy Semiconductor Technology (Hangzhou) Ltd., Hangzhou (CN)

(72) Inventors: Jianxin Wang, Hangzhou (CN); Qiukai Huang, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,832

(22) Filed: Sep. 1, 2015

(65) Prior Publication Data

US 2016/0066378 A1 Mar. 3, 2016

(30) Foreign Application Priority Data

Sep. 1, 2014 (CN) .......................... 2014 1 0440951

(51) Int. Cl.
*H05B 37/02* (2006.01)
*H05B 33/08* (2006.01)
*H02M 3/158* (2006.01)

(52) U.S. Cl.
CPC ...... *H05B 33/0815* (2013.01); *H02M 3/1582* (2013.01); *H05B 33/0827* (2013.01)

(58) Field of Classification Search
CPC .... H05B 33/0815; H05B 33/0827; H02J 1/00

USPC ................... 315/307, 297, 291, 210
See application file for complete search history.

(56) References Cited

U.S. PATENT DOCUMENTS

| | | | | |
|---|---|---|---|---|
| 2009/0072755 | A1* | 3/2009 | Prexl | H05B 33/0818 315/291 |
| 2013/0082624 | A1* | 4/2013 | Brassfield | H05B 33/0818 315/297 |

FOREIGN PATENT DOCUMENTS

| CN | 102695341 A | 9/2012 |
|---|---|---|
| CN | 102832792 A | 12/2012 |
| CN | 103236787 A | 8/2013 |
| CN | 103281838 A | 9/2013 |
| CN | 103929063 A | 7/2014 |
| CN | 104159355 A | 11/2014 |

* cited by examiner

*Primary Examiner* — Daniel D Chang
(74) *Attorney, Agent, or Firm* — Westman, Champlin & Koehler, P.A.

(57) ABSTRACT

The present disclosure relates to LED driving circuit and method using a single inductor. A constant current controller controls a power stage circuit to provide a constant output signal, and thus to provide a constant current signal for an LED load. A dimming controller regulates luminance of the LED load. A constant voltage generating circuit receives the current signal at an output terminal of the power stage circuit and a reserve supply voltage for providing a supply voltage for the dimming controller. Compared with the prior art, the present disclosure does not need an independent power supply chip, and reduces components such as inductors and rectifying transistors. Thus, a peripheral circuit is simplified, and an overall size of the system is reduced.

8 Claims, 3 Drawing Sheets

LED DRIVING CIRCUIT AND METHOD USING SINGLE INDUCTOR

CLAIM OF PRIORITY

This application claims priority to Chinese Application No. 201410440951.0, filed Sep. 1, 2014 (published as CN 104202876 A), which is hereby incorporated by reference.

BACKGROUND OF THE DISCLOSURE

Field of the Disclosure

The present disclosure relates to the field of power electronics, and more particularly, to multi-channel LED driving circuit and method using a single inductor.

Description of the Related Art

LED lamps are widely used in the fields of lighting and decoration, as ideal products because they are energy-efficient and environment-friendly. Some specific driving circuits must be developed to achieve constant current control due to characteristics of the LED lamps. A driving circuit typically is an integrated chip 1, as shown in FIG. 1. The chip 1 is a constant current control chip for receiving a DC bus voltage and providing a constant current signal Vout1 through a BUCK converter including switches $Q_{M1}$, $Q_{R1}$ and an inductor L1. The constant current Vout1 is used for driving the LED lamps. When the LED light source includes a plurality of LED strings, a dimming controller (for example, MCU in FIG. 1) is used for regulating color temperature and brightness by dimming the plurality of LED strings. As shown in FIG. 1, a conventional dimming controller needs an additional power supply chip. Typically, the dimming controller has a relatively low supply voltage, for example, 3.3V or 5V. So a voltage obtained from the DC bus voltage cannot be directly used as the supply voltage for the dimming controller as it is usually larger than the supply voltage of the dimming controller. Thus, a voltage converter, such as a chip 2, is necessary for receiving the DC bus voltage, and generating a constant voltage signal Vout through a BUCK converter including switches QM2, QR2 and an inductor L2. The constant voltage signal Vout2 is used for dimming controller MCU.

As shown in FIG. 1, the conventional LED driving circuit has complex peripheral components, including at least two power transistors, at least two rectifying transistors and at least two inductors. The number of chips is 2, which increases a product cost and introduces a complex control scheme.

BRIEF DESCRIPTION OF THE DISCLOSURE

In view of this, the present disclosure provides an LED driving circuit and method using a single inductor, which, on one hand, achieve constant current control of an LED load, and on the other hand, generate a reserve supply voltage by a constant voltage generating circuit for supplying energy to a dimming controller or to a USB port. The reserve supply voltage is obtained by charging a capacitor of the constant voltage generating circuit with a current signal at an output terminal of a power stage circuit, without an additional chip. A single chip will provide constant current control and brightness adjustment of the LED load.

In one embodiment, there is provided an LED driving circuit using a single inductor, comprising:

a power stage circuit configured to receive a DC bus voltage and output a constant signal for driving an LED load;

a constant current controller configured to receive a feedback signal representing an LED load current, and control operations of a power transistor and a rectifying transistor in the power stage circuit in accordance with the feedback signal to maintain an output signal of the power stage circuit to be constant; and a constant voltage generating circuit configured to be connected in series between the LED load and ground, receive a current signal at the output terminal of the power stage circuit, and generate a constant signal by charging a capacitor in the constant voltage generating circuit with the current signal, wherein the constant voltage is configured as a reserve supply voltage of the LED driving circuit.

Preferably, the LED driving circuit further comprises a dimming controller.

The dimming controller is configured to receive a dimming signal, and control an average value of the LED load current to have a luminance corresponding to the dimming signal, wherein the reserve supply voltage is used for providing a supply voltage to the dimming controller.

Preferably, the LED driver further comprises a USB port. The reserve supply voltage is used for supplying power energy to the USB port.

Further, the constant voltage generating circuit comprises a first switch, a second switch, a capacitor and a voltage controller, and the first switch and the capacitor are connected in series with each other between a negative electrode of the LED load and ground; the constant voltage is a voltage signal across the capacitor;

the second switch is connected between the negative electrode of the LED load and ground; and the voltage controller is configured to receive the voltage signal across the capacitor and a reference voltage signal, and output a first switching control signal and a second switching control signal, wherein the first switching control signal controls a switching state of the first switch and the second switching control signal controls a switching state of the second switch.

Further, the voltage controller comprises a voltage sampling circuit, a comparator and a driver, and the voltage sampling circuit is configured to sample the voltage signal across the capacitor, and generate a feedback signal;

the comparator is configured to receive the feedback signal and the reference voltage signal, and generate a comparison signal by comparison; and the driver is configured to receive the comparison signal and generate the first switching control signal and the second switching control signal.

Preferably, the reference voltage signal has different values when the reserve supply voltage is supplied to different circuits.

Preferably, the LED load is one or more LED strings.

Preferably, the first diode, the first switch, the second switch, the voltage controller and the constant current controller of the constant voltage generating circuit are integrated into a single chip.

In another embodiment, there is provided a driving method using a single inductor, for an LED driver comprising a power stage circuit, comprising:

receiving a DC bus voltage and outputting a constant signal for driving an LED load;

receiving a feedback signal representing an LED load current, and controlling operations of a power transistor and a rectifying transistor in the power stage circuit in accordance with the feedback signal to maintain an output signal of the power stage circuit to be constant; and receiving a current signal at the output terminal of the power stage circuit, and generating a constant signal by charging a capacitor with the current signal, wherein the constant voltage is configured as a reserve supply voltage of the LED driving circuit, and the capacitor is connected in series between the LED load and ground.

In the LED driving circuit and method using a single inductor according to the above embodiments, a constant current controller controls a power stage circuit to provide a constant output signal, and thus to provide a constant current signal for an LED load, a dimming controller regulates luminance of the LED load, and a constant voltage generating circuit receives the current signal at an output terminal of the power stage circuit and a reserve supply voltage for providing a supply voltage for the dimming controller. Compared with the prior art, the present disclosure does not need an independent power supply chip, and reduces components such as inductors and rectifying transistors. Thus, a peripheral circuit is simplified, an overall size is reduced, and a product cost is reduced.

DETAILED DESCRIPTION OF EMBODIMENTS OF THE DISCLOSURE

Reference will now be made in detail to particular embodiments of the disclosure, it will be understood that the scope of the present invention is not limited to these embodiments. On the contrary, the disclosure is intended to cover alternatives, modifications and equivalents that may be included within the spirit and scope of the disclosure as defined by the appended claims. Furthermore, in the following detailed description of the present disclosure, numerous specific details are set forth in order to provide a thorough understanding of the present disclosure. However, it will be readily apparent to one skilled in the art that the present disclosure may be practiced without these specific details.

Figure 1:
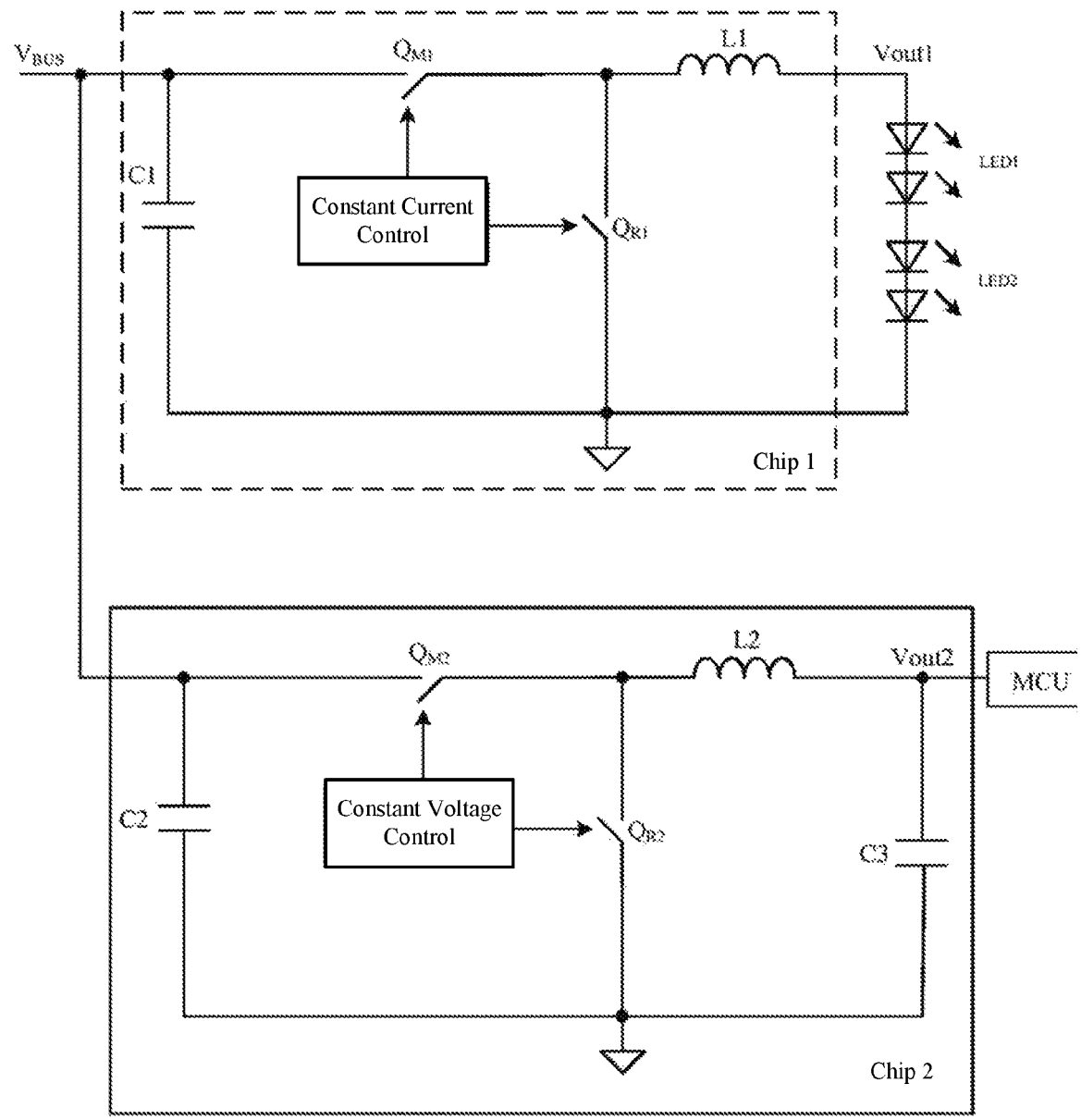
FIG. 1 is a schematic diagram of an LED driving circuit according to the prior art.
Figure 2:
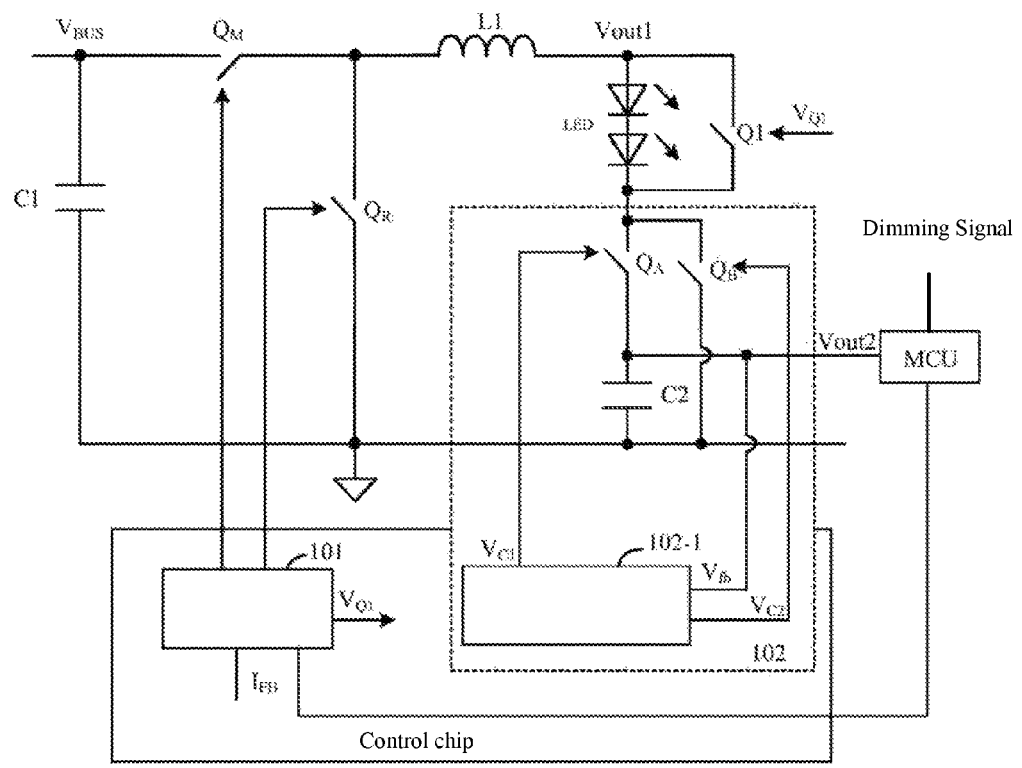
FIG. 2 is a schematic diagram of an LED driving circuit using a single inductor according to an embodiment of the present disclosure.

Referring to FIG. 2, a schematic diagram of an LED driving circuit using a single inductor according to the present disclosure is shown. As shown in FIG. 2, an LED driving circuit includes a power stage circuit. In this embodiment, the power stage circuit includes a power transistor $Q_M$, a rectifying transistor $Q_R$, and a first inductor L1, together as a BUCK converter. Here, the rectifying transistor is also a power transistor, as an example. The power stage circuit receives a DC bus voltage $V_{BUS}$, and provides a constant signal for driving the LED load. Here, the constant signal means a constant current signal, as those in the following paragraphs. The LED driving circuit further includes a constant current controller 101 configured to receive a feedback signal $I_{FB}$ representing an LED current, and control switching state of a power transistor $Q_M$ and a rectifying transistor $Q_R$ in the power stage circuit in accordance with the feedback signal IFB to maintain an output signal of the power stage circuit to be constant.

Further, the LED driving circuit also includes a constant voltage generating circuit 102, as shown in FIG. 2. The constant voltage generating circuit is connected in series between the LED load and ground. Specifically, the constant voltage generating circuit 102 includes a first switch $Q_A$, a second switch $Q_B$, a capacitor C2 and a voltage controller 102-1. The first switch QA and the capacitor C2 are connected in series between a negative electrode of the LED circuit and ground. A voltage Vout2 across the capacitor is used as a reserve supply voltage. The voltage controller 102-1 receives the voltage signal Vout2 across the capacitor and a reference voltage signal Vref1, and provides a first switching control signal $V_{C1}$ and a second switching control signal $V_{C2}$ The first switching control signal $V_{C1}$ controls a switching state of the first switch $Q_A$ and the second switching control signal $V_{C2}$ controls a switching state of the first switch $Q_B$. Moreover, an output voltage Vout1 of the power stage circuit in FIG. 2 is used as a driving voltage of the LED load.

Figure 3:
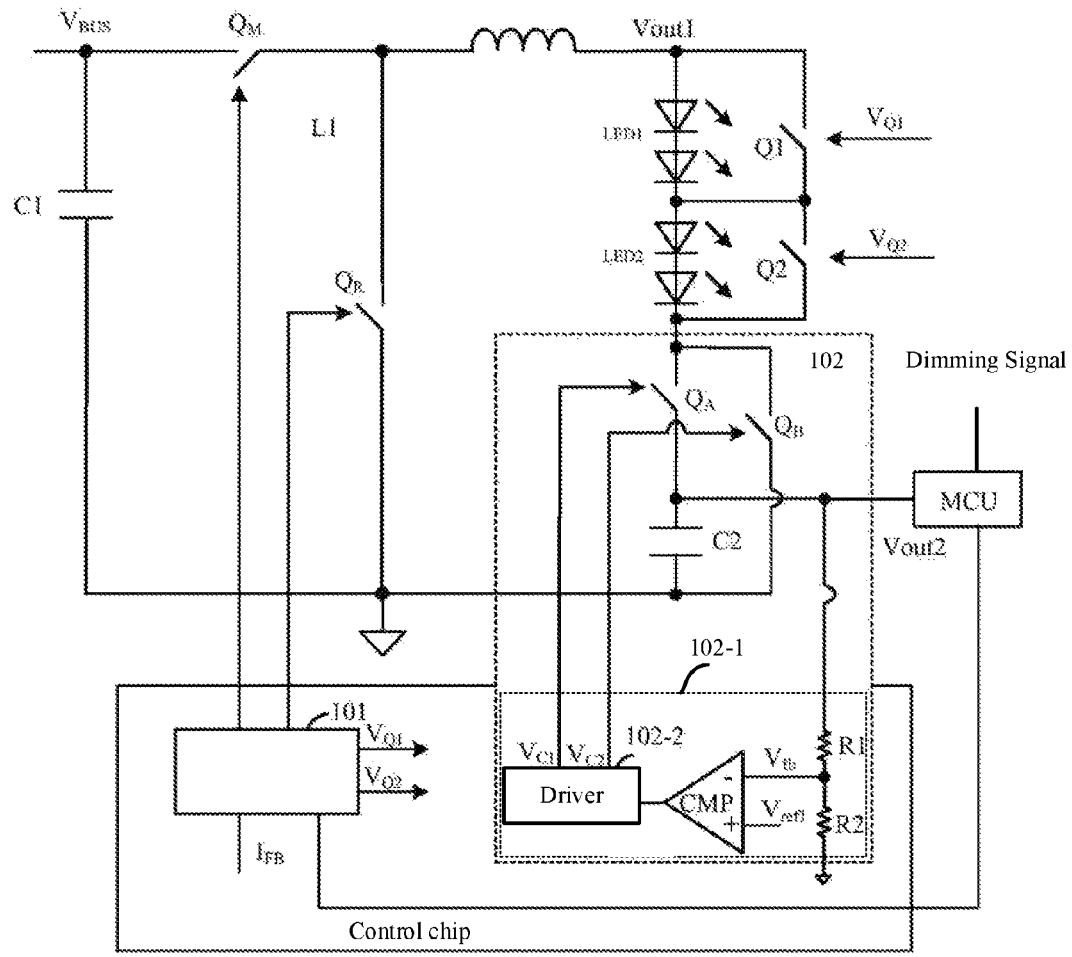
FIG. 3 is a detailed circuit diagram of an LED driving circuit using a single inductor according to an embodiment of the present disclosure.

Specifically, referring to FIG. 3, an example of the LED driving circuit is shown. The voltage controller 102-1 includes a voltage sampling circuit consisting of resistors R1 and R2, a comparator CMP, and a driver 102-2. Here, the comparator is a hysteresis comparator. The voltage sampling circuit receives the voltage signal Vout2 across the capacitor, and generates a feedback signal $V_{ref1}$ after voltage division. The comparator receives the feedback signal $V_{fb}$ and the reference voltage signal $V_{ref1}$ and generates a comparison signal after comparison. The driver receives the comparison signal, and generates a first switching control signal $V_{C1}$ and a second switching control signal $V_{C2}$. It will be understood be one skilled person that the voltage sampling circuit may also be configured to directly receive the voltage signal across the capacitor as a feedback signal $V_{fb}$.

In this embodiment, the LED driving circuit further comprises a dimming controller MCU. The dimming controller MCU receives a dimming signal, such as a PWM dimming signal, and controls an average value of the LED load current to have a luminance corresponding to the dimming signal. The reserve supply voltage is used for providing a supply voltage to the dimming controller MCU. It will be understood by one skilled person that the LED load may be one or more LED strings. In this embodiment, the LED load may be one LED string. The power transistor Q1 is connected in parallel with the LED strings. The dimming controller MCU is connected to the constant current controller 101. The constant current controller outputs a dimming signal, such as $V_{Q1}$ as shown in FIG. 2, to control a switching state of the power transistor Q1 for controlling the average value (or luminance) of current through the LED string. In an alternative embodiment, the LED load may be two LED strings. The power transistors Q1 and Q2 are connected in series with the two LED strings, respectively. The dimming controller MCU is connected to the constant current controller 101. The constant current controller outputs dimming signals, such as $V_{Q1}$ and $V_{Q2}$, to control switching states of the power transistors Q1 and Q2 for controlling the average values (or luminance) of currents through the two LED strings.

It will be understood by one skilled person that in a case that the LED driving circuit does not need dimming function, the reserve supply voltage may be used for other purposes. For example, the reserve supply voltage is used for supplying energy to a USB port. Accordingly, the reference voltage signal $V_{ref1}$ may have a value which is different when the reserve supply voltage is supplied to different circuits.

The LED driving circuit according to the present embodiment has been described in connection with the above circuit diagram. In a case that the dimming controller MCU needs an expected supply voltage having a predetermined value, such as 3.3V or 5V, the reference voltage signal $V_{ref1}$ should be set to a value corresponding to a divided voltage of the predetermined value by a voltage division network. In a case that the feedback signal $V_{fb}$ indicates that the reserve supply voltage Vout2 is less than the predetermined value, the first power transistor $Q_A$ is turned on and the second power transistor $Q_B$ is turned off, and the capacitor C2 is charged by an output current signal of the power stage circuit. In a case that the feedback signal $V_{fb}$ indicates that the reserve supply voltage Vout2 is larger than the predetermined value, the first switch $Q_A$ is turned off and the second switch $Q_B$ is turned on, and the capacitor C2 is not charged by the output current signal. The reserve supply voltage Vout2 is regulated to the predetermined value as required by the above operations. Additionally, it should be noted that when the power stage circuit begins to operate, the capacitor C2 is charged by the output current signal through the power transistor Q1, and when the voltage across the capacitor C2 reaches an operating voltage of the dimming controller MCU, the dimming controller MCU begins to operate.

As mentioned above, the present disclosure does not need an additional chip for converting a DC bus voltage to a supply voltage. Electric energy is obtained by charging a capacitor at a load side. The power stage circuit needs only one inductor. The number of the chips is reduced because an additional power converter is omitted.

The above embodiments are described with a BUCK circuit as an example. However, the present disclosure is not limited to these embodiments. The present disclosure can be applied in any suitable power stage circuit, such as a BUCK-BOOST circuit.

Moreover, it should be noted that in the present disclosure, the first switch $Q_A$, the second switch $Q_B$, and the voltage controller 102-1 of the constant voltage generating circuit, and the constant current controller 101 can be integrated into one chip, such as the chip shown in FIG. 2 or 3. Moreover, the power transistor $Q_M$ and the rectifying transistor $Q_R$ of the power stage circuit may also be integrated into this control chip. In a case that the LED driving circuit also includes a dimming controller MCU, the dimming controller MCU may also be integrated into the control chip.

In another embodiment, there is provided a driving method using a single inductor, for an LED driver comprising a power stage circuit, comprising:

S1: receiving a DC bus voltage and outputting a constant signal for driving an LED load;

S2: receiving a feedback signal representing an LED load current, and controlling operations of a power transistor and a rectifying transistor in the power stage circuit in accordance with the feedback signal to maintain an output signal of the power stage circuit to be constant; and S3: receiving a current signal at the output terminal of the power stage circuit, and generating a supply voltage signal by charging a capacitor with the output current signal, wherein the supply voltage signal is configured as a reserve supply voltage of the LED driving circuit, and the capacitor is connected in series between the LED load and ground.

It will be understood that other topologies of the power stage circuit can also be used in the present disclosure in light of the above embodiments. Details are not repeated here. The invention is intended to cover alternatives, modifications and equivalents that may be included within the spirit and scope of the invention as defined by the appended claims.

To sum up, the LED driving circuit and method using a single inductor according to the present disclosure do not need an additional chip for converting a DC bus voltage to a supply voltage. Electric energy is obtained by charging a capacitor at an output side. The power stage circuit needs only one inductor. The number of the chips is reduced because an additional power converter is omitted.

The LED driving circuit and method using a single inductor according to the present disclosure have been described in detail for the preferable embodiments. It is apparent for one skilled person that other technique or configuration or circuits or electronic devices, if being equivalents, can also be used in these embodiments.

Although various embodiments of the present disclosure are described above, these embodiments neither present all details, nor imply that the present disclosure is limited to these embodiments. Obviously, many modifications and changes may be made in light of the teaching of the above embodiments. These embodiments are presented and some details are described herein only for explaining the principle of the disclosure and its actual use, so that one skilled person can practice the present disclosure and introduce some modifications in light of the disclosure. The invention is intended to cover alternatives, modifications and equivalents that may be included within the spirit and scope of the invention as defined by the appended claims.

What is claimed is:

1. An LED driving circuit using a single inductor, comprising:
 a power stage circuit configured to receive a DC bus voltage and output a constant signal for driving an LED load;
 a constant current controller configured to receive a feedback signal representing an LED load current, and control operations of a power transistor and a rectifying transistor in said power stage circuit in accordance with said feedback signal to maintain an output signal of said power stage circuit to be constant; and
 a constant voltage generating circuit configured to be connected in series with said LED load between an output terminal of said power stage circuit and ground, receive a current signal at said output terminal of said power stage circuit, and generate a constant voltage signal by charging a capacitor through a first switch in said constant voltage generating circuit with said current signal, wherein said constant voltage signal is configured as a reserve supply voltage of said LED driving circuit.

2. The driving circuit according to claim 1, further comprising a dimming controller configured to receive a dimming signal, and control an average value of said LED load current to have a luminance corresponding to said dimming signal,
 wherein said reserve supply voltage is used for providing a supply voltage to said dimming controller.

3. The driving circuit according to claim 1, wherein said constant voltage generating circuit further comprises a second switch, and a voltage controller, and said first switch and said capacitor are connected in series with each other between a negative electrode of said LED load and ground; said constant voltage signal is a voltage signal across said capacitor;
 said second switch is connected between said negative electrode of said LED load and ground; and said voltage controller is configured to receive said voltage signal across said capacitor and a reference voltage signal, and output a first switching control signal and a second switching control signal, wherein said first switching control signal controls a switching state of said first switch and said second switching control signal controls a switching state of said second switch.

4. The driving circuit according to claim 3, wherein said voltage controller comprises a voltage sampling circuit, a comparator and a driver, and said voltage sampling circuit is configured to sample said voltage signal across said capacitor, and generate a feedback signal;

said comparator is configured to receive said feedback signal and said reference voltage signal, and generate a comparison signal by comparison; and said driver is configured to receive said comparison signal and generate said first switching control signal and said second switching control signal.

5. The driving circuit according to claim 3, wherein said reference voltage signal has a predetermined value when said reserve supply voltage is supplied to an external circuit.

6. The driving circuit according to claim 1, wherein said LED load is one or more LED strings.

7. The driving circuit according to claim 3, wherein said first switch, said second switch, said voltage controller of said constant voltage generating circuit and said constant current controller are integrated into a single chip.

8. An LED driving method using a single inductor, for an LED driver comprising a power stage circuit, comprising:
receiving a DC bus voltage and outputting a constant signal for driving an LED load;
receiving a feedback signal representing an LED load current, and controlling operations of a power transistor and a rectifying transistor in said power stage circuit in accordance with said feedback signal to maintain an output signal of said power stage circuit to be constant; and
receiving a current signal at an output terminal of said power stage circuit, and generating a constant voltage signal by charging a capacitor through a first switch with said current signal, wherein said constant voltage signal is configured as a reserve supply voltage of said LED driving circuit, and said capacitor is connected in series with said LED load between said output terminal of said power stage circuit and ground.

* * * * *